United States Patent
Lin et al.

(10) Patent No.: US 9,417,722 B2
(45) Date of Patent: Aug. 16, 2016

(54) TOUCH PANEL AND FABRICATION METHOD THEREOF

(71) Applicant: WINTEK CORPORATION, Taichung (TW)

(72) Inventors: Yi-Chun Lin, Changhua County (TW); Siang-Lin Huang, Taichung (TW); Kuo-Chang Su, Taichung (TW)

(73) Assignee: WINTEK CORPORATION, Taichung (TW)

( * ) Notice: Subject to any disclaimer, the term of this patent is extended or adjusted under 35 U.S.C. 154(b) by 144 days.

(21) Appl. No.: 14/273,552

(22) Filed: May 9, 2014

(65) Prior Publication Data

US 2014/0333556 A1  Nov. 13, 2014

(30) Foreign Application Priority Data

May 10, 2013 (TW) .............................. 102116647 A (51) Int. Cl.
*G06F 3/041* (2006.01)

(52) U.S. Cl.
CPC ....................................... *G06F 3/041* (2013.01)

(58) Field of Classification Search
None
See application file for complete search history.

(56) References Cited

U.S. PATENT DOCUMENTS

| | | | | |
|---|---|---|---|---|
| 2011/0128114 A1* | 6/2011 | Kimura | ................... | G06F 3/045 338/13 |
| 2012/0139866 A1* | 6/2012 | Jung | ..................... | G06F 3/0421 345/174 |
| 2012/0182249 A1* | 7/2012 | Endo | ....................... | G01L 1/205 345/173 |
| 2012/0249452 A1* | 10/2012 | Kitano | .................... | G06F 3/044 345/173 |
| 2013/0293508 A1* | 11/2013 | Lin | ......................... | G06F 3/044 345/174 |

* cited by examiner

*Primary Examiner* — Andrew Sasinowski
*Assistant Examiner* — Henok Heyi
(74) *Attorney, Agent, or Firm* — Ming Chow; Sinorica, LLC (57) ABSTRACT

The present invention discloses a touch panel, having a light transmission touch sensing region and a peripheral region adjacent to at least one side of the light transmission touch sensing region. The touch panel includes a substrate, a patterned decoration frame, a decoration layer, and at least one touch sensing element. The patterned decoration frame is disposed on a surface of the substrate and in the peripheral region. The decoration layer is disposed on the patterned decoration frame, and the touch sensing element is disposed in the light transmission touch sensing region.

19 Claims, 10 Drawing Sheets

TOUCH PANEL AND FABRICATION METHOD THEREOF

BACKGROUND OF THE INVENTION

1. Field of the Invention

The present invention relates to a touch panel and a fabrication method thereof, and more particular, to a touch panel having a stereoscopic frame and a fabrication method thereof.

2. Description of the Prior Art

Touch panel has been widely used in various electronic products, including smart phones, GPS navigator systems, tablet PCs, personal digital assistants (PDA), and laptop PCs, due to the human-machine interaction property thereof.

Conventional touch panel usually has monochromatic frame on its surface, which lacks stereoscopic appearance and variability. It is because when the frame of the conventional touch panel is fabricated by using colored particles, which are usually delivered with a carrier, the nozzle used in the fabricating process is easily blocked with those colored particles. Thus, those colored particles will be distributed non-uniformly, thereby leading to poor color mixing performance. Moreover, the frame of the conventional touch panel fabricated by aforementioned processes usually has poor optical density (OD), and which is less capable of shielding the metal wire of the touch panel. Therefore, the conventional touch panel cannot meet the market demands. It is the reason that the frame of the conventional touch panel has to be limited in dark colors or monochromatic appearance. Hence, how to provide an attractive and various frame of the touch panel through a simplified and convenient fabricating process is still a main objective in the field.

SUMMARY OF THE INVENTION

It is one of the primary objectives of the present invention to provide a touch panel and a fabrication method thereof, wherein a patterned decoration frame is utilized to improve the quality sense of the frame with the stereoscopic appearance of the touch panel, so as to obtain the high variable appearance of the touch panel.

To achieve the purpose described above, the present invention provides a touch panel having a light transmission touch sensing region and a peripheral region disposed adjacent to at least one side of the light transmission touch sensing region. The touch panel of the present invention includes a substrate, a patterned decoration frame, a decoration layer, and at least one touch sensing element. The patterned decoration frame is disposed on a surface of the substrate and in the peripheral region, the decoration layer is disposed on the patterned decoration frame, and the touch sensing element is disposed in the light transmission touch sensing region.

To achieve the purpose described above, the present invention also provides a fabrication method of a touch panel, wherein the touch panel has a light transmission touch sensing region and a peripheral region disposed adjacent to at least one side of the light transmission touch sensing region. The fabrication method of the touch panel includes providing a substrate, forming at least one touch sensing layer on a surface of the substrate, forming a patterned decoration frame on the surface of the substrate and in the peripheral region, covering a portion of the touch sensing layer, and then, forming a decoration layer on the patterned decoration frame, wherein the decoration layer covers a portion of the patterned decoration frame.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to those skilled in the art of the present invention, preferred embodiments are detailed as follows. The preferred embodiments of the present invention are illustrated in accordance with the accompanying figures to detail describe the contents and effects to be achieved.

Figure 1:
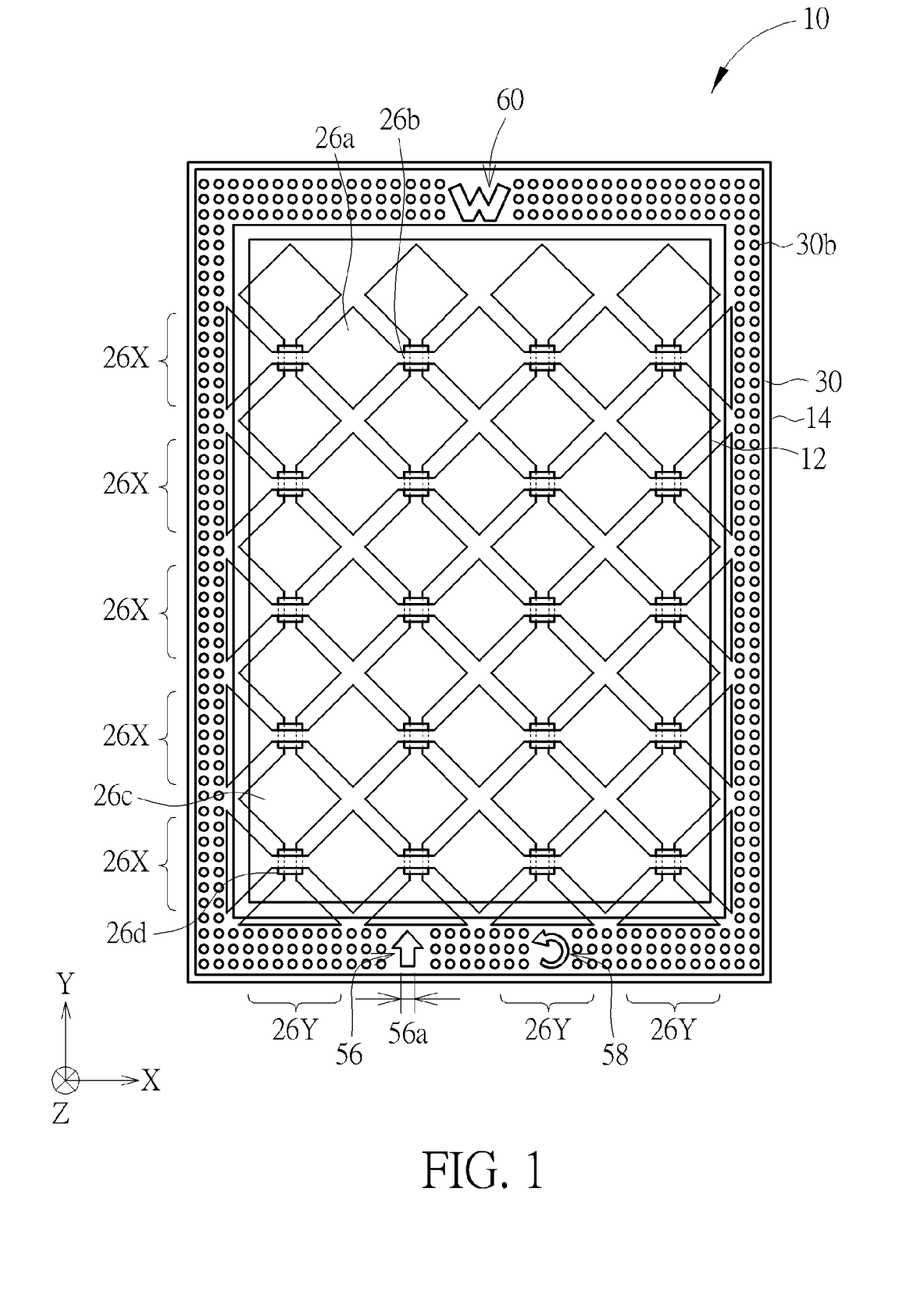
FIG. 1 is a schematic top view illustrating a touch panel according to a first embodiment of the present invention.
Figure 2:
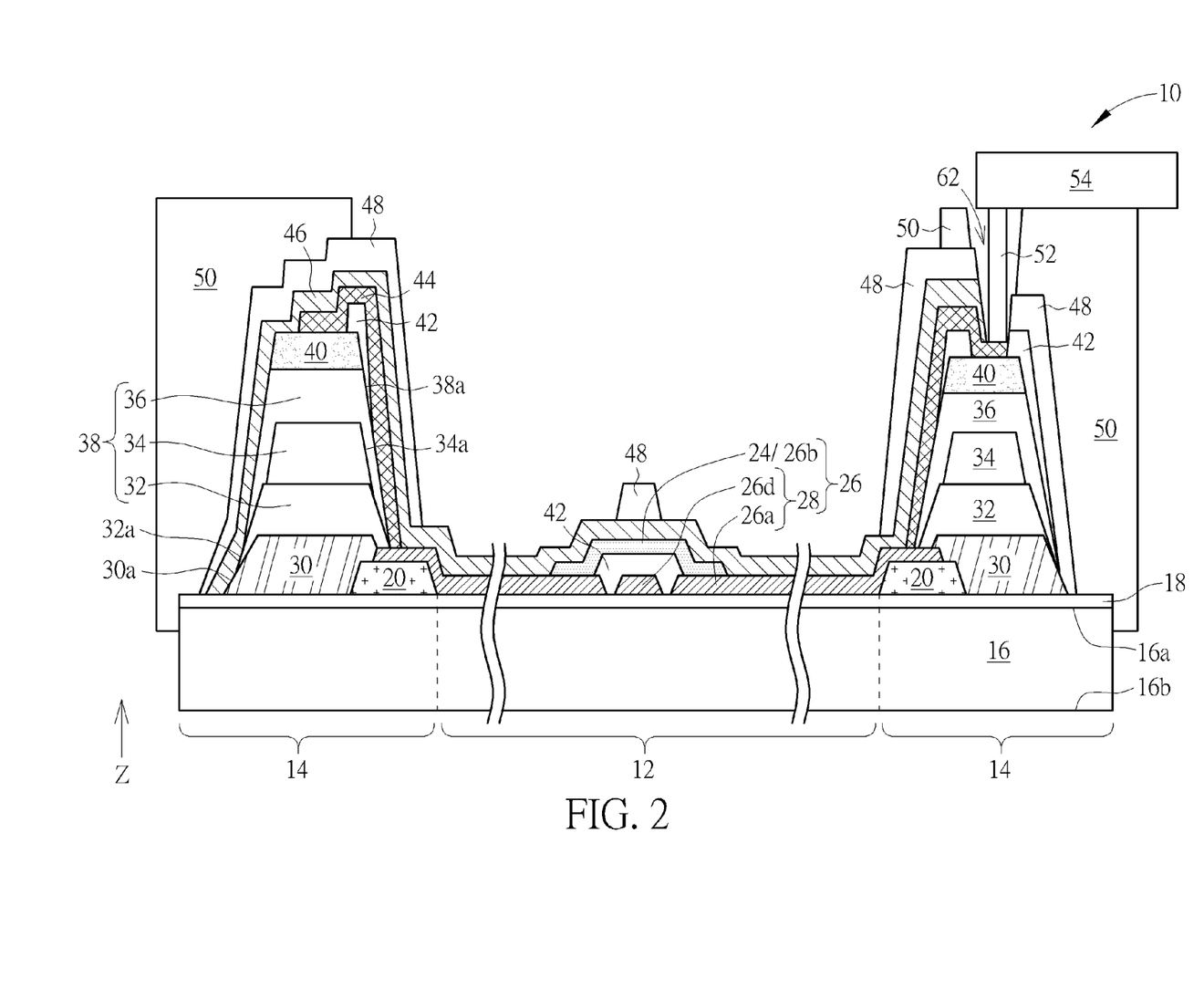
FIG. 2 is a cross-sectional schematic view of a portion of the touch panel according to the first embodiment of the present invention.

Referring to FIG. 1 and FIG. 2, FIG. 1 is a schematic top view illustrating a touch panel according to a first embodiment of the present invention, and FIG. 2 is a cross-sectional schematic view of a portion of the touch panel according to the first embodiment of the present invention. In order to simply present the main features of the present invention, only a part of elements in the touch panel are illustrated in FIG. 1. As shown in FIG. 1 and FIG. 2, a touch panel 10 of the present invention has a light transmission touch sensing region 12 and a peripheral region 14. The peripheral region 14 is disposed adjacent to at least one side of the light transmission touch sensing region 12. In the present embodiment, the peripheral region 14 is disposed surrounding the periphery of the light transmission touch sensing region 12, but the present invention is not limited thereto and the peripheral region 14 can be disposed only adjacent to partial edges of the light transmission touch sensing region 12 in other embodiments. Further, the peripheral region 14 may optionally include touch sensing element (s) (not shown in the drawings), but still be classified as the peripheral region 14 which is explained here first. The touch panel 10 comprises a substrate 16, a patterned decoration frame 30, and a decoration layer 38, wherein the patterned decoration frame 30 is disposed on the surface 16a of the substrate 16 in the peripheral region 14. The decoration layer 38 is disposed on the surface of the patterned decoration frame 30, and an outer edge 30a of the patterned decoration frame 30 is uncovered by the decoration layer 38. Please also refer to FIG. 5 and FIG. 6. The patterned decoration frame 30 comprises at least one patterned hole 30b exposing a portion of the surface 16a of the substrate 16. In the present embodiment, the patterned decoration frame 30 comprises a plurality of the patterned holes 30b uniformly arranged in the patterned decoration frame 30, thereby a portion of the decoration layer 38 which is disposed on the surface of the patterned decoration frame 30 fills in the patterned holes 30b. Thus, the decoration layer 38 has an uneven surface, such as having a wave-shaped surface. In the following paragraphs for describing FIG. 5 and FIG. 6, the structure about the decoration layer 38 filled in the patterned holes 30b will be further detailed. In the present embodiment, the patterned holes 30b have a round shape as an example, but the patterned holes 30b can also have various geometry patterns, irregular patterns, or other designed patterns. Also, the patterned holes 30b are not limited to be arranged uniformly in the patterned decoration frame 30. Moreover, the patterned decoration frame 30 is not limited to be disposed in the whole peripheral region 14 as shown in FIG. 1, whereas it can be disposed in a portion of the peripheral region 14 only. Additionally, the patterned decoration frame 30 is not limited to comprise patterns on the whole area thereof, and the patterns can be only disposed in a portion of the patterned decoration frame 30. The decoration layer 38 and the patterned decoration frame 30 preferably have different colors. For example, the patterned decoration frame 30 is composed of pearl white ink and the decoration layer 38 is composed of white ink, but not limited thereto and the two said colors can be exchanged. In different embodiments, the patterned decoration frame 30 and the decoration layer 38 may have colors either in different color series, such as blue and yellow, or in the same color series, such as red and pink or white and pearl white. Preferably, the two colors of the patterned decoration frame 30 and the decoration layer 38 are different enough to be identified by naked eyes. In a preferred embodiment, only one of the patterned decoration frame 30 and the decoration layer 38 has pearl color or metal luster color, so as to be easily distinguished from the other one and to perform stereoscopic appearance. Since a portion of the decoration layer 38 is filled in the patterned holes 30b, the patterned decoration frame 30 and the portion of the decoration layer 38 filled in the patterned holes 30b are both revealed from a front side of the touch panel 10 (namely, a surface 16b of the substrate 16). Therefore, the peripheral region 14 can perform various colors and stereoscopic appearance.

In addition, the touch panel 10 can further optionally include at least one functional hole defined in the peripheral region 14, for example the functional holes 56, 58, and 60 as shown in FIG. 1. In the present embodiment, the functional holes 56, 58 are used as touch button of the peripheral region 14, and the functional hole 60 may have a trademark pattern, but not limited thereto. The functional holes can also refer to a sensing hole of an infrared sensor or a pilot light hole. In order to avoid the patterned holes 30b to having incomplete patterns near the functional holes 56, 58, 60, the patterned holes 30b are preferably disposed away from (namely, being not located in) those functional holes 56, 58, 60 and an area surrounded those functional holes 56, 58, 60, especially when the diameter 56a of the patterns of those functional holes 56, 58, 60 is smaller than the size of the patterned holes 30b. Moreover, in order to further avoid the printing tolerance leading to overlapping or partial overlapping between the patterned holes 30b and the functional holes 56, 58, 60, a distance around 50 micrometers to 350 micrometers may be retained between the patterned holes 30b and the functional holes 56, 58, 60 in a preferred embodiment. Precisely speaking, the functional holes 56, 58, 60, of the present embodiment are defined by the decoration layer 38, and relative larger regions are defined in the patterned decoration frame 30 corresponding to the functional holes 56, 58, 60 respectively, wherein no patterned holes 30b are disposed in the defined corresponding regions of the patterned decoration frame 30, but not limited thereto. However, the present invention is not limited to the aforementioned design and the patterned decoration frame 30 may entirely cover at least one of the regions of the functional holes 56, 58, 60 in other embodiments, which means the patterned holes 30b are disposed in the said region of at least one of the functional holes 56, 58, 60. For example, the patterned decoration frame 30 may entirely cover the functional holes 56, 58, the touch buttons, in the present embodiment, thus the touch buttons are less possible to be seen when the backlight is shut down, but will be clearly revealed under the supply of the backlight.

The decoration layer 38 in the present embodiment includes a first decoration layer 32, a second decoration layer 34, and a third decoration layer 36 sequentially disposed on the patterned decoration frame 30, wherein the first decoration layer 32, the second decoration layer 34, and the third decoration layer 36 preferably have an identical color or colors in the same color series, but not limited thereto. For example, all of the three decoration layers are composed of white ink, but not limited thereto. In the present embodiment, the area of the second decoration layer 34 is slightly smaller than the area of the first decoration layer 32, and the area of the third decoration layer 36 is slightly larger than the area of the second decoration layer 34 but slightly smaller than the area of the first decoration layer 32. Accordingly, the third decoration layer 36 covers the sidewall 34a of the second decoration layer 34, covers at least one portion of the sidewall 32a of the first decoration layer 32 and exposes an outer edge of the first decoration layer 32, but not limited thereto. In other embodiments, the areas of the first decoration layer 32, the second decoration layer 34, and the third decoration layer 36 may be gradually narrowed in order. In other words, the first decoration layer 32, the second decoration layer 34, and the third decoration layer 36 are stacked in a step pyramid shape.

In addition, the touch panel 10 further includes at least one touch sensing element 26 disposed on the surface 16a of the substrate 16 in the light transmission touch sensing region 12. In a preferred embodiment, the touch sensing element 26 may include first axis electrodes 16X and second axis electrodes 26Y interlacedly arranged on the substrate 16 and electrically isolated from each other, wherein the first axis electrodes 26X and the second axis electrodes 26Y extend along different directions respectively. For example, the first axis electrodes 26X and the second axis electrodes 26Y extend along the horizontal direction X and the vertical direction Y which is substantially perpendicular to the horizontal direction X as shown in FIG. 1. Each of the first axis electrodes 26X and each of the second axis electrodes 26X include a plurality of touch sensing electrodes 26a, 26c connected in a serial respectively. The touch sensing electrodes 26a, 26c are uniformly disposed in the light transmission touch sensing region 12 and electrically connected with each other through wirings 26b and 26d respectively, so as to achieve required detecting function of touch sensing. The wirings 26b as shown in FIG. 1 are consisted of a bridge connection element 24 as shown in FIG. 2. The touch sensing electrodes 26a, 26c can be designed in any shape according to practical requirements, such as rhomboid electrodes or polygon electrodes, but not limited thereto. The touch sensing element 26 may include transparent conductive material, such as indium tin oxide (ITO), indium zinc oxide (IZO), sliver nanowires, carbon nanotubes, graphene, and conductive polymer material.

At least one portion of the touch sensing element 26 extends toward the peripheral region 14 and is disposed between the pattered decoration frame 30 and the substrate 16 in the peripheral region 14. Namely, the patterned decoration frame 30 covers a portion of a surface of the touch sensing element 26 in a vertical projection direction Z. Additionally, the touch panel 10 can optionally include a light shielding layer, such as a black matrix layer 40 disposed on a surface of the decoration layer 38 in the present embodiment. The touch panel 10 further includes at least one wire 44 disposed on the decoration layer 38 and the black matrix layer 40 and extended downward along the sidewall 38a of the decoration layer 38, thereby covering the sidewall 38a, contacting the touch sensing element 26 in the peripheral region 14 and electrically connected to the touch sensing element 26. It is noted that the wire 44 and the bridge connection element 24 may include the same material, such as metal material having good conductivity.

Furthermore, the touch panel 10 may optionally include an inner frame 20 disposed on the surface 16a of the substrate 16 in the peripheral region 14, adjacent to an inner edge of the peripheral region 14. In a preferred embodiment, an inner edge of the inner frame 20 is disposed along the inner edge of the peripheral region 14. As a result, at least one portion of the inner frame 20 is disposed between the patterned decoration frame 30 and the substrate 16, and the touch sensing element 26 in the peripheral region 14 partially covers a surface of the inner frame 20. Under such arrangement, the inner frame 20 and the black matrix layer 40 are capable of shielding the wire 44 in the peripheral region 14, and the inner frame 20 can also shield possible uneven edges or unexpected color-revealing of the decoration layer 38 and the patterned decoration frame 30 due to the formation tolerance or stack design issues. Therefore, the inner frame 20 of the present embodiment preferably includes a light shielding layer with a high optical density. For example, the light shielding layer may be consisted of a material the same as the black matrix layer 40 or have a multilayer structure including a black matrix layer 40, but not limited thereto. However, in other embodiments, the inner frame 20 can be omitted, and a special patterned perception to the inner edge of the peripheral region 14 may be provided by revealing the inner edge of the patterned decoration frame 30 or the decoration layer 38. Also, the touch panel 10 can optionally include a buffer layer 18, entirely covering the surface 16a of the substrate 16, and the buffer layer may include for example silicon dioxide. The touch panel 10 may optionally further include an insulation layer 42, disposed between the black matrix layer 40, or the decoration layer 38, and the wire 44 in the peripheral region 14, and also disposed between the touch sensing electrodes 26a and the wirings 26d in the light transmission touch sensing region 12, for electrically isolating the first axis electrodes 26X from the second axis electrodes 26Y. In addition, the touch panel 10 may optionally further include a first protection layer 46 and a second protection layer 48 disposed on the surfaces of the wire 44 and the surface of the touch sensing element 26, in order to provide shielding function and improved smoothness. The material of the first protection later 46 for example may be silicon dioxide, silicon nitride, or a combination of these two materials. Therefore, except for shielding, the first protection layer 46 can also serve as an optical matching layer or an index matching layer. The materials of the insulation layer 42 and the second protection layer 48 for example include organic insulation material(s). Except for protecting the elements in the peripheral region 14, the second protection layer 48 may further extend to the light transmission touch sensing region 12 and cover the light transmission touch sensing region 12 in other embodiments. In other words, the second protection layer 48 may optionally in the form of completely covering the surface 16a of the substrate 16. Also the materials of the insulation layer 42 and the second protection layer 48 are not limited to organic insulation materials, and may be inorganic insulation material(s), such as silicon oxide. Moreover, the touch panel 10 may include an anisotropic conductive film (ACF) 52 and a flexible print circuit (FPC) 54, electrically connected to the wire 44 for transmitting the touch sensing signals.

In another aspect, the touch panel 10 may include an outer frame 50 disposed in the part of the peripheral region 14, wherein the outer frame 50 covers a portion of at least one of the decoration layer 38 and the patterned decoration frame 30 in the vertical projection direction Z, but not limited thereto. The outer frame 50 may cover both of the decoration layer 38 and the patterned decoration frame 30. The outer frame 50 may have the same color as the patterned decoration frame 30, or have the same color as the decoration layer 38, to solve the colorless and nonuniformly coloring issues of the peripheral region 14, but not limited thereto. In other embodiments, the outer frame 50 may have a different color from the patterned decoration frame 30 and the decoration layer 38, to further provide far diverse colors to the peripheral region 14 of the touch panel 10. Also, the outer frame 50 may include a single layer or multilayer of ink, and for example include a first outer frame layer and a second outer frame layer. Wherein, the first outer frame layer is composed of the material the same as the patterned decoration frame 30, with patterned holes, and the second outer frame layer and the decoration layer 38 have the same material, thereby performing stereoscopic perception to the outer frame 50. Please note that during fabricating the touch panel 10 of the present embodiment, the major films of the touch panel 10, including the touch sensing element 26, the patterned decoration frame 30 and the decoration layer 38, can be first fabricated on a large sized substrate, which is then sliced into the substrate 16 with the desired size of the touch panel 10, and the outer frame 50 is finally formed to cover the outer edge, as well as the sidewall of the substrate 16. However, if each film of the touch panel 10 is directly formed on the substrate 16 sliced from the large sized substrate, the fabrication of the outer frame 50 may be omitted.

Figure 3:
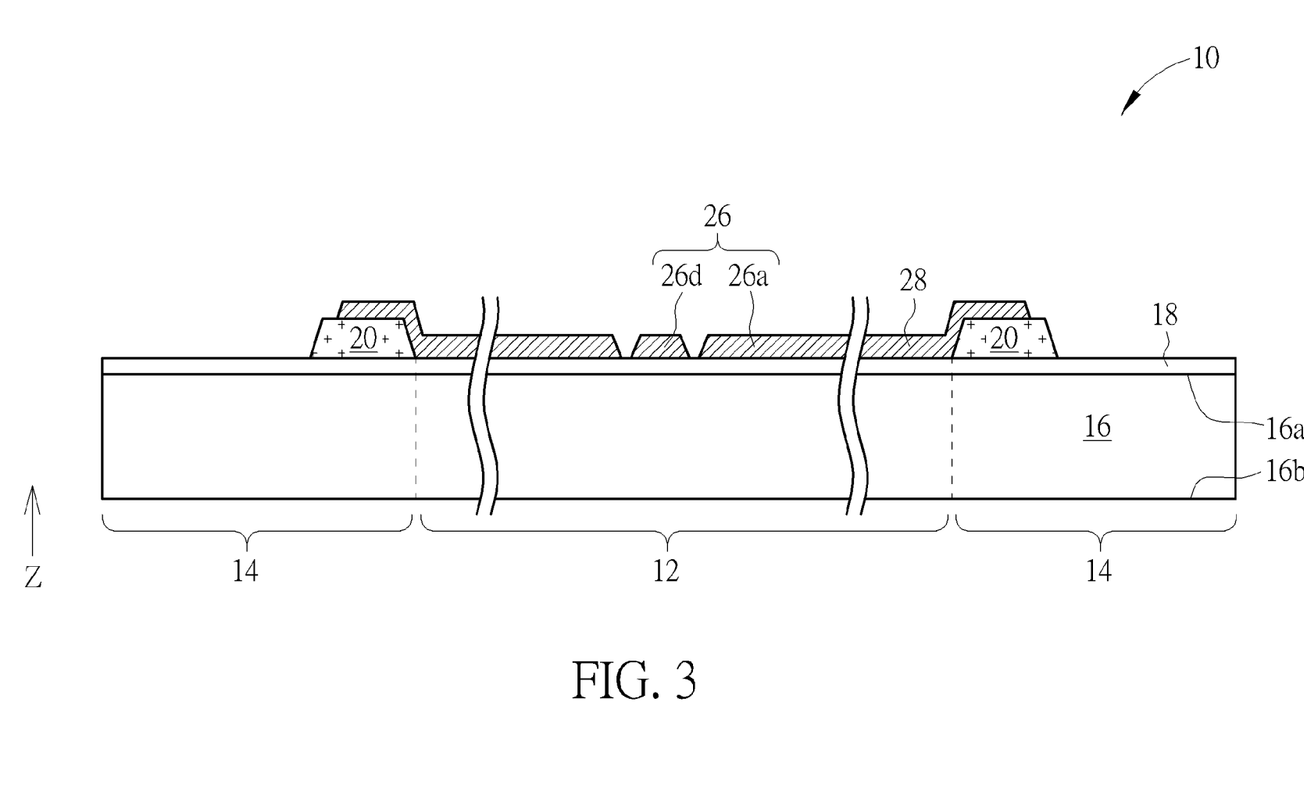
FIG. 3 to FIG. 4 are schematic diagrams illustrating a fabrication process of the touch panel according to the first embodiment of the present invention.
Figure 4:
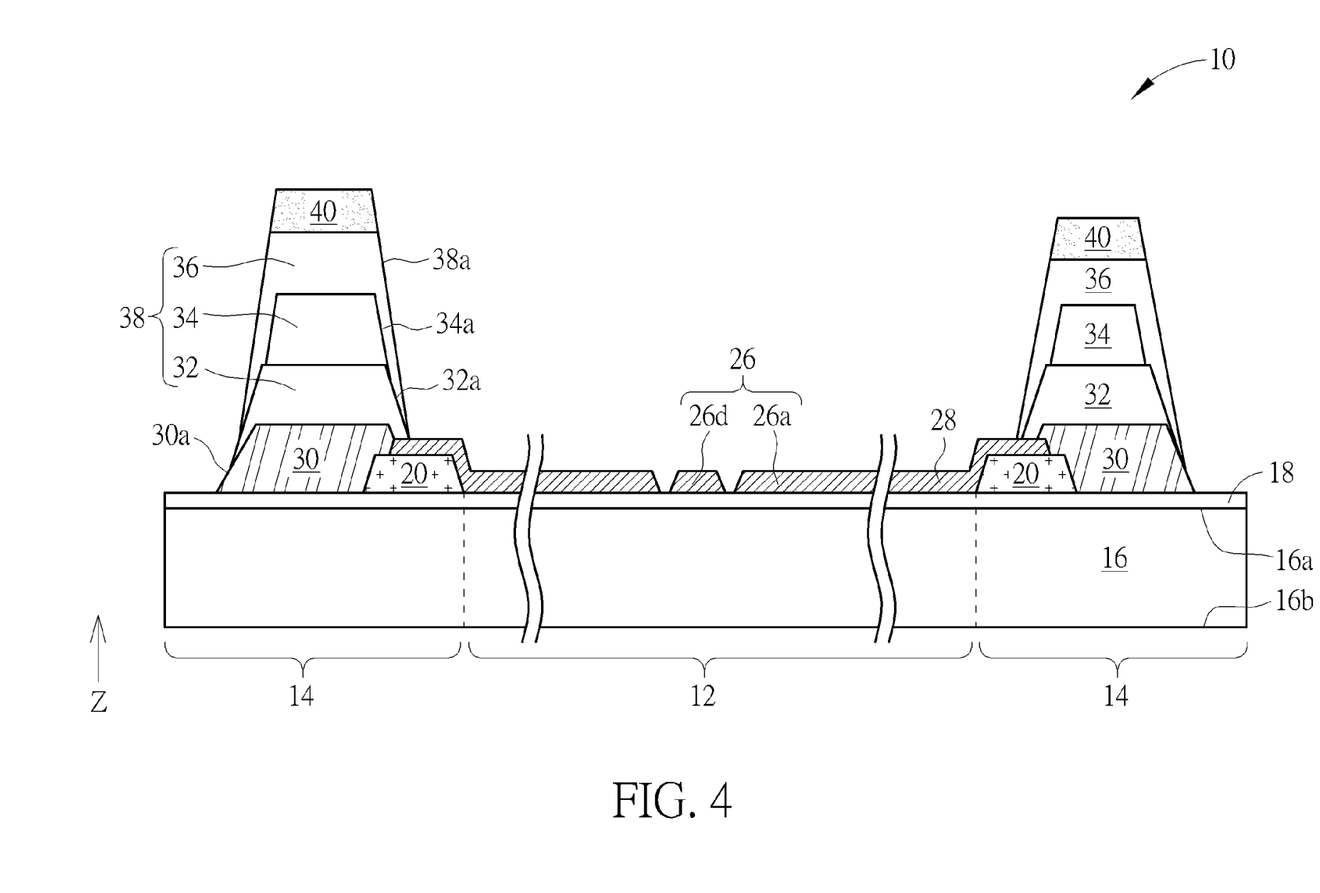

Referring to FIG. 3 and FIG. 4, the fabrication method of the touch panel 10 in the first preferred embodiment is illustrated. First of all, as shown in FIG. 3, the substrate 16 is provided, and the light transmission touch sensing region 12 and the peripheral region 14 are defined on the substrate 16. Then, the buffer layer 18 can be optionally formed on the surface 16a of the substrate 16, the inner frame 20 is formed on the surface 16a of substrate 16 in the inner part of the peripheral region 14 and at least one touch sensing layer 28 is then formed on the surface 16a of the substrate 16. The patterns of the touch sensing electrodes 26a, 26c and the wirings 26d can be defined on the light transmission touch sensing region 12 through one or more lithography processes, and a portion of the touch sensing layer 28 (namely, the aforementioned at least one portion of the touch sensing element 26) extends toward the peripheral region 14 and covers a portion of the inner frame 20. Next, as shown in FIG. 4, the patterned decoration frame 30, the decoration layer 38 and the black matrix layer 40 are sequentially formed on the substrate 16 in the peripheral region 14, wherein the patterned decoration frame 30 covers a portion of the touch sensing layer 28 and the decoration layer 38 covers a portion of the patterned decoration frame 30 and optionally includes the first decoration layer 32, the second decoration layer 34 and the third decoration layer 36. The inner frame 20, the patterned decoration frame 30, the decoration layer 38, and the black matrix layer 40 can be fabricated through screen printing process, printing process, ink jet process, or coating process respectively.

Further referring to FIG. 2, the patterned insulation layer 42 is next formed, covering a portion of the wirings 26d, the touch sensing electrodes 26a and the black matrix layer 40, and a patterned conductive layer is formed, including the wire 44 and the bridge connection elements 24 (also known as the wiring 26b), wherein the wire 44 is disposed on the decoration layer 38, covering the sidewall 38a of the decoration layer 38 and electrically connected to the touch sensing layer 28. The bridge connection element 24 is disposed in the light transmission touch sensing region 12 and electrically connected to a portion of the touch sensing layer 28. Then, the first protection layer 46 and the second protection layer 48 are optionally formed on the surface 16a of the substrate 16 sequentially, covering the patterned decoration frame 30 and the decoration layer 38. The first protection layer 46 covers the touch sensing layer 28 and the conductive layer including the bridge connection elements 24 and the wire 44, and the second protection layer 48 covers a portion of the bridge connection elements 24. Moreover, a contact hole 62 can be formed in the first protection layer 46 and the second protection layer 48 to expose a portion of the wire 44. A conductive material, such as the anisotropic conductive film 52, may be used to electrically connect the wire 44 to the flexible print circuit 54.

According to the first embodiment of the present invention, the fabrication of the touch sensing layer 28 which may achieve 300° C. during the fabricating process is first performed, and the following fabrication processes posterior to the fabrications of the patterned decoration frame 30 and the decoration layer 38, for example, the fabrications of other films and wires, can all be performed under a lower temperature, such as 200° C. Therefore, even though the ink materials of the patterned decoration frame 30 and the decoration layer 38 can only take the temperature under 200° C. to 250° C., the fabrication sequence of the first embodiment effectively solve the color deviation problem of ink materials in the prior art, so as to improve the appearance of the touch panel 10.

Figure 5:
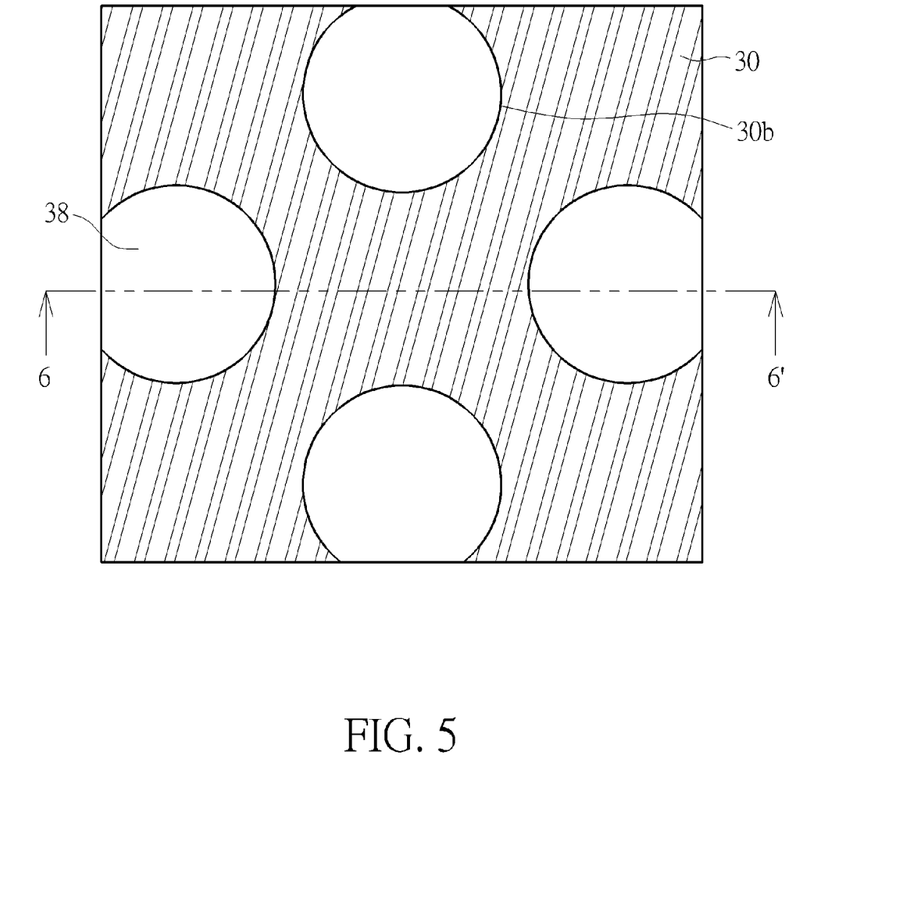
FIG. 5 is an enlarged diagram illustrating a portion of a peripheral region of the touch panel as shown in FIG. 1.
Figure 6:
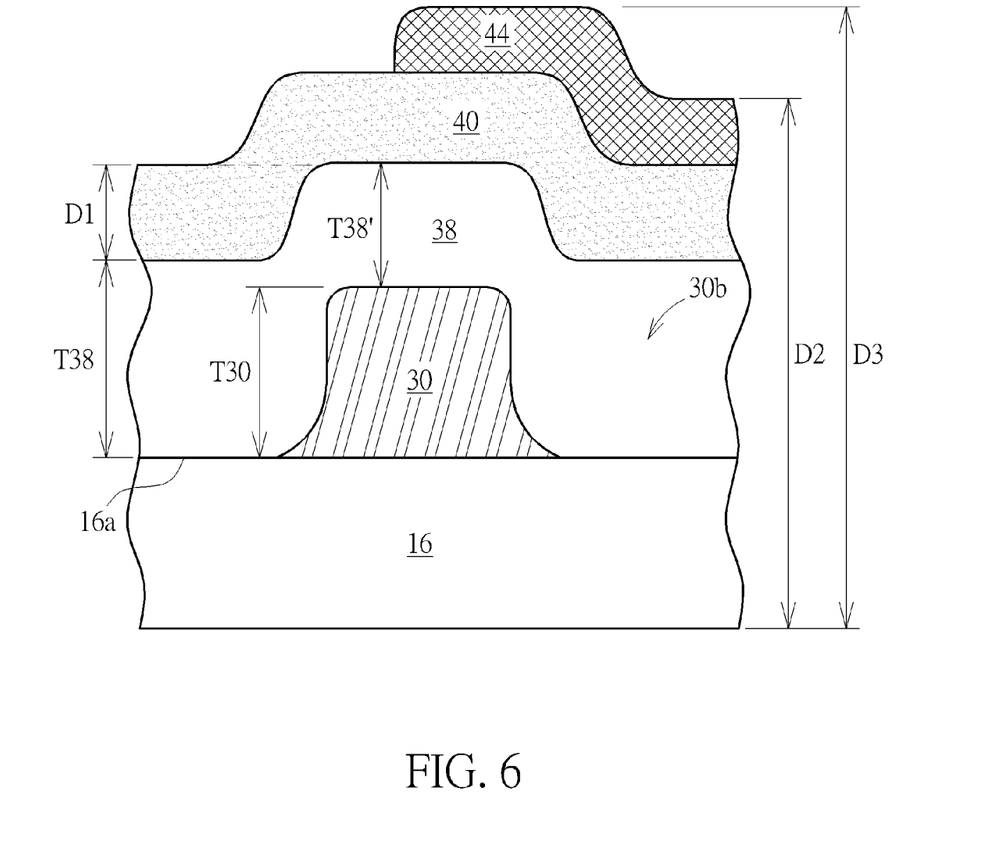
FIG. 6 is across-sectional schematic view taken along the cross line 6-6' in FIG. 5.

Referring to FIG. 5 and FIG. 6, FIG. 5 is an enlarged diagram illustrating a portion of a peripheral region 14 of the touch panel 10 as shown in FIG. 1, and FIG. 6 is a cross-sectional schematic view along the cross line 6-6' in FIG. 5, only illustrating the cross-sectional structures of the patterned decoration frame 30, the decoration layer 38, the black matrix layer 40 and the wire 44 but omitting the buffer layer 18. As shown in FIG. 5 and FIG. 6, the patterned decoration frame 30 has a thickness T30 at the portion without the patterned holes 30b, and the patterned holes 30b expose a portion of the substrate 16. A portion of the decoration layer 38 is filled in the patterned holes 30b, thereby the decoration layer 38 having an uneven surface, such as having a wave surface. However, it should be noted that the decoration layer 38 has a thickness T38 in the patterned holes 30b which is slightly greater than a thickness T38' of the decoration layer 38 disposed on the surface of the patterned decoration frame 30. In other words, the slope gap D1 of the decoration layer 38 is smaller than the thickness T30 of the patterned decoration frame 30. The black matrix layer 40 and the wire 44 are stacked on the surface of the decoration layer 38 sequentially. Therefore, there is a distance D2 between the portion of the wire 44 disposed above the patterned holes 30b and the surface 16a of the substrate 16, there is a distance D3 between the portion of the wire 44 disposed other than the patterned holes 30b and the substrate 16, wherein the distance D2 is smaller than the distance D3.

The touch panel and the fabrication method thereof in the present invention are not limited by the aforementioned embodiments and have other embodiments which are disclosed in the following paragraphs. For making it easier to compare the differences between each embodiment, the following description will only detail the dissimilarities among those embodiments and the identical features will not be redundantly described. Please note that the same features among those embodiments are marked with the same number.

Figure 7:
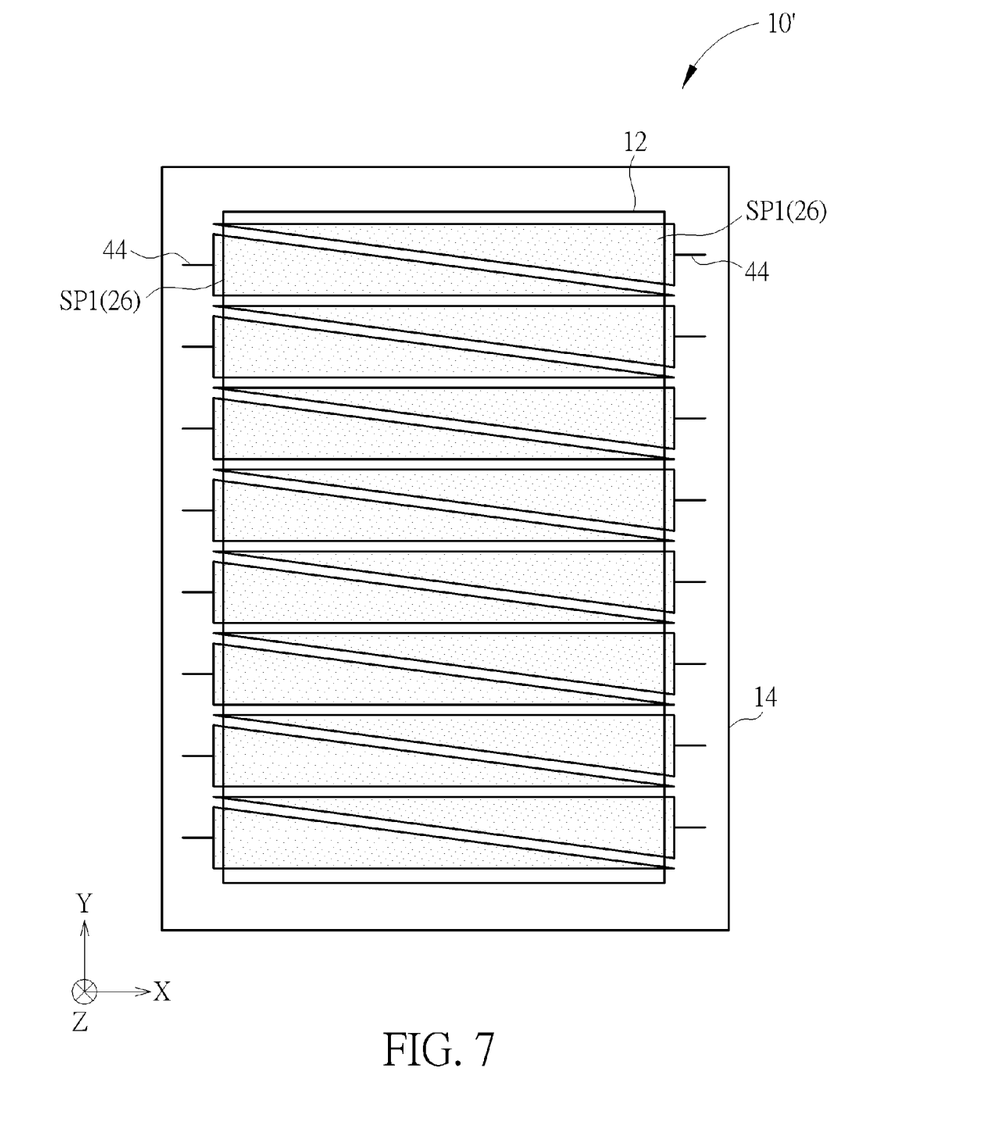
FIG. 7 is a schematic top view illustrating a touch panel according to a second embodiment of the present invention.

Referring to FIG. 7, FIG. 7 is a top view illustrating a touch panel according to the second embodiment of the present invention. For simplifying the drawings, FIG. 7 only illustrates the touch sensing element 26 and the wires 44. As shown in FIG. 7, the differences between the first embodiment and the second embodiment are characterized in that the touch panel 10' of the present embodiment includes a plurality of touch sensing electrodes SP1 separately disposed in the light transmission touch sensing region 12. Each wire 44 is connected to one of the touch sensing electrodes SP1, and a portion of the touch sensing electrodes SP1 extends to the peripheral region 14 and is disposed in the peripheral region 14 for being electrically connected to the corresponding wire 44. Except for the touch sensing electrodes SP1, other features, disposing positions and material properties of the rest elements in the touch panel 10' of the present embodiment are all similar to those described in the first embodiment and will not be further detailed herein. Please note that each of the touch sensing electrodes SP1 of the present embodiment is preferably a triangle electrode, but the present invention is not limited thereto. The touch sensing electrodes SP1 in any various shapes can also be arranged uniformly in the light transmission touch sensing region 12 in accordance with practical requirement, to provide required detecting function of the touch sensing. Also, the material of the touch sensing electrodes SP1 for example can include a transparent conductive material, such as indium tin oxide or metal mesh material. In other embodiments, the touch sensing electrodes SP1 may also include a plurality of rectangular touch sensing electrodes separately disposed from each other. However, the present invention is not limited to the aforementioned arrangement, and the touch sensing electrodes SP1 may have other regular or irregular shapes arranged uniformly in the light transmission touch sensing region 12 in accordance with practical requirement to provide required detecting function of touch sensing. For example, the touch sensing electrodes SP1 may have a plurality of strip electrodes and a plurality of block-formed electrodes being disposed between two adjacent strip electrodes alternately.

Figure 8:
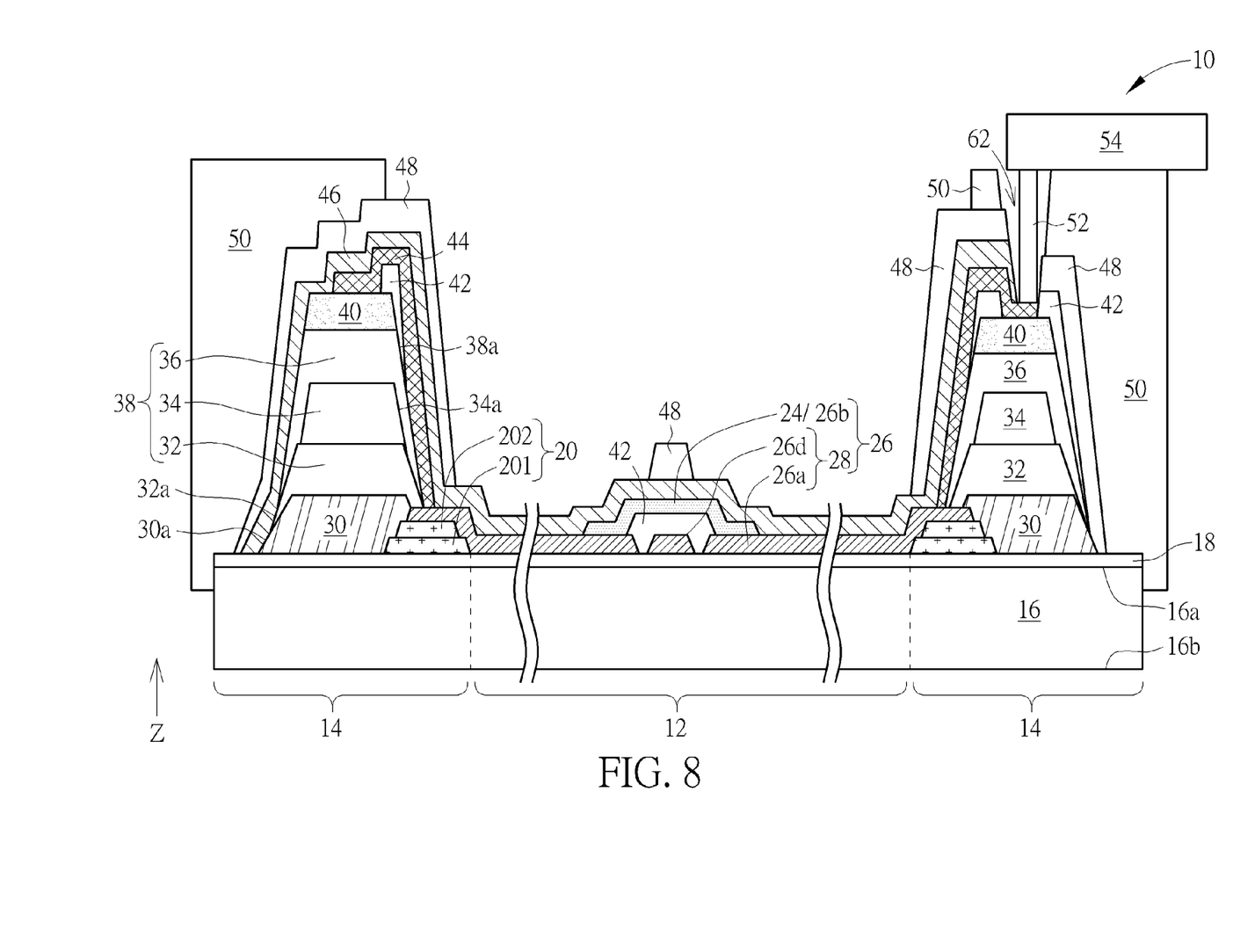
FIG. 8 is a cross-sectional schematic view illustrating a portion of a touch panel according to a third embodiment of the present invention.

Referring to FIG. 8, FIG. 8 is a cross-sectional schematic view illustrating a portion of a touch panel according to the third embodiment of the present invention. In comparison with the first embodiment, the present embodiment is characterized in that the inner frame 20 includes a first inner frame layer 201 and a second inner frame layer 202 stacked on the surface 16a of the substrate 16 sequentially. If the color of the inner frame 20 is light, or if the inner frame 20 has a lower optical density, it is preferably to form at least two layers of the inner frame layer in order to completely shielding the wire 44 and the edges of the patterned decoration frame 30 and the decoration layer 38. In the present embodiment, the area of the second inner frame layer 202 is slightly smaller than the area of the first inner frame layer 201. In other words, the inner frame 20 has a stair step like cross-sectional profile, thereby the touch sensing layer 28 can obtain a preferable climbing structure, but not limited thereto. In other embodiments, the area, as well as the relative disposition of the first inner frame layer 201 and the second inner frame layer 202 may have different arrangement. For example, the second inner frame layer 202 may cover the sidewall of the first inner frame layer 201.

Figure 9:
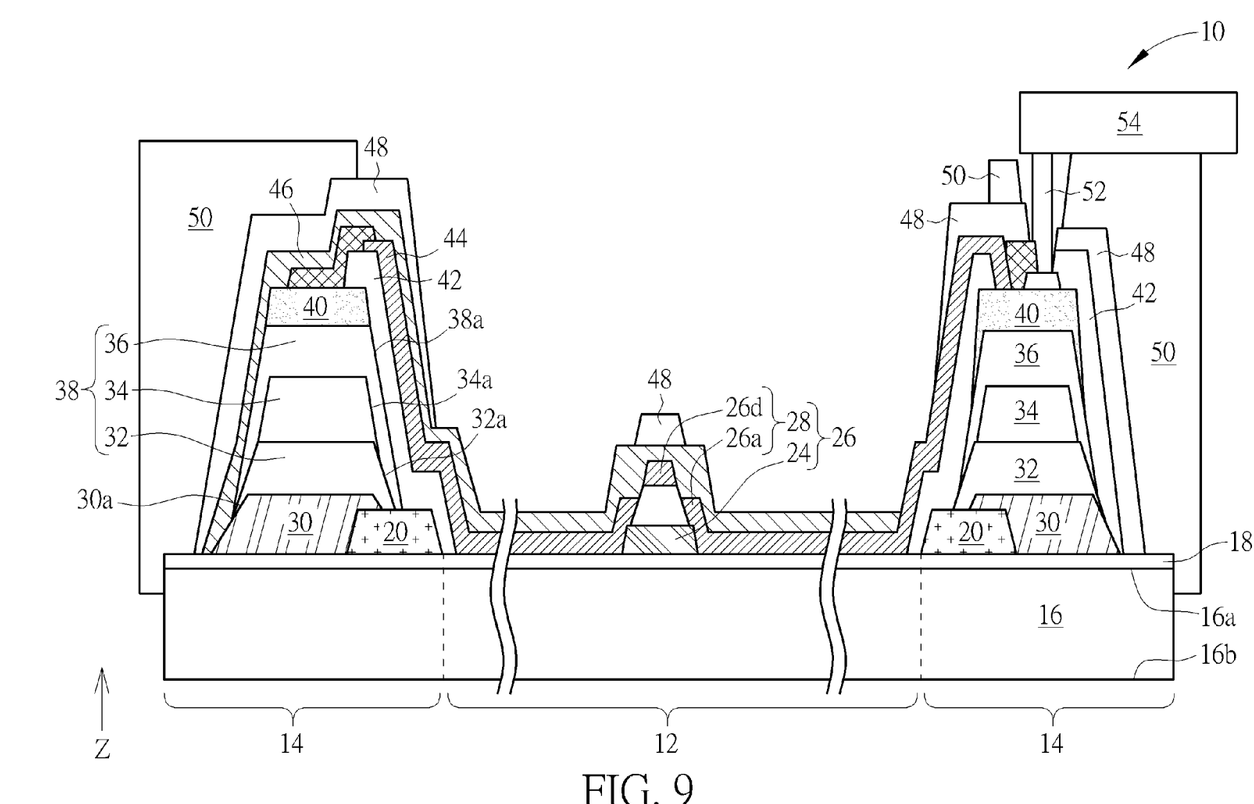
FIG. 9 is a schematic cross-sectional view illustrating a touch panel according to a fourth embodiment of the present invention.

Referring to FIG. 9, FIG. 9 is a cross-sectional schematic view illustrating a portion of a touch panel according to the fourth embodiment of the present invention. In comparison with the first embodiment, the present embodiment is characterized in that the portion of the touch sensing element 26 extending toward the peripheral region 14 and being disposed in the peripheral region 14 covers the sidewall 38a of the decoration layer 38. In other words, the aforementioned portion of the touch sensing element 26 partially covers the decoration layer 38 and the patterned decoration frame 30 in the vertical projection direction Z, contacting and being electrically connected to the wire 44 disposed on the decoration layer 38 and the black matrix layer 40. Therefore, in the fabrication processes of the present embodiment, the bridge connection elements 24 and the inner frame 20 are fabricated at first, and then the patterned decoration frame 30, the decoration layer 38, the black matrix layer 40 and the insulation layer 42 are fabricated sequentially. After that, the touch sensing layer 28 is then fabricated, wherein a portion of the touch sensing layer 28 is disposed on the black matrix layer 40, so as to be connected to the wire 44 fabricated in the following steps. In the present embodiment, it is preferably to fabricate the patterned decoration frame 30 and the decoration layer 38 by using inks or materials which are tolerant to high temperature, or to fabricate other material layers under a lower temperature or a temperature which is sustainable by the ink or the photoresist, after fabricating the patterned decoration frame 30 and the decoration layer 38.

Figure 10:
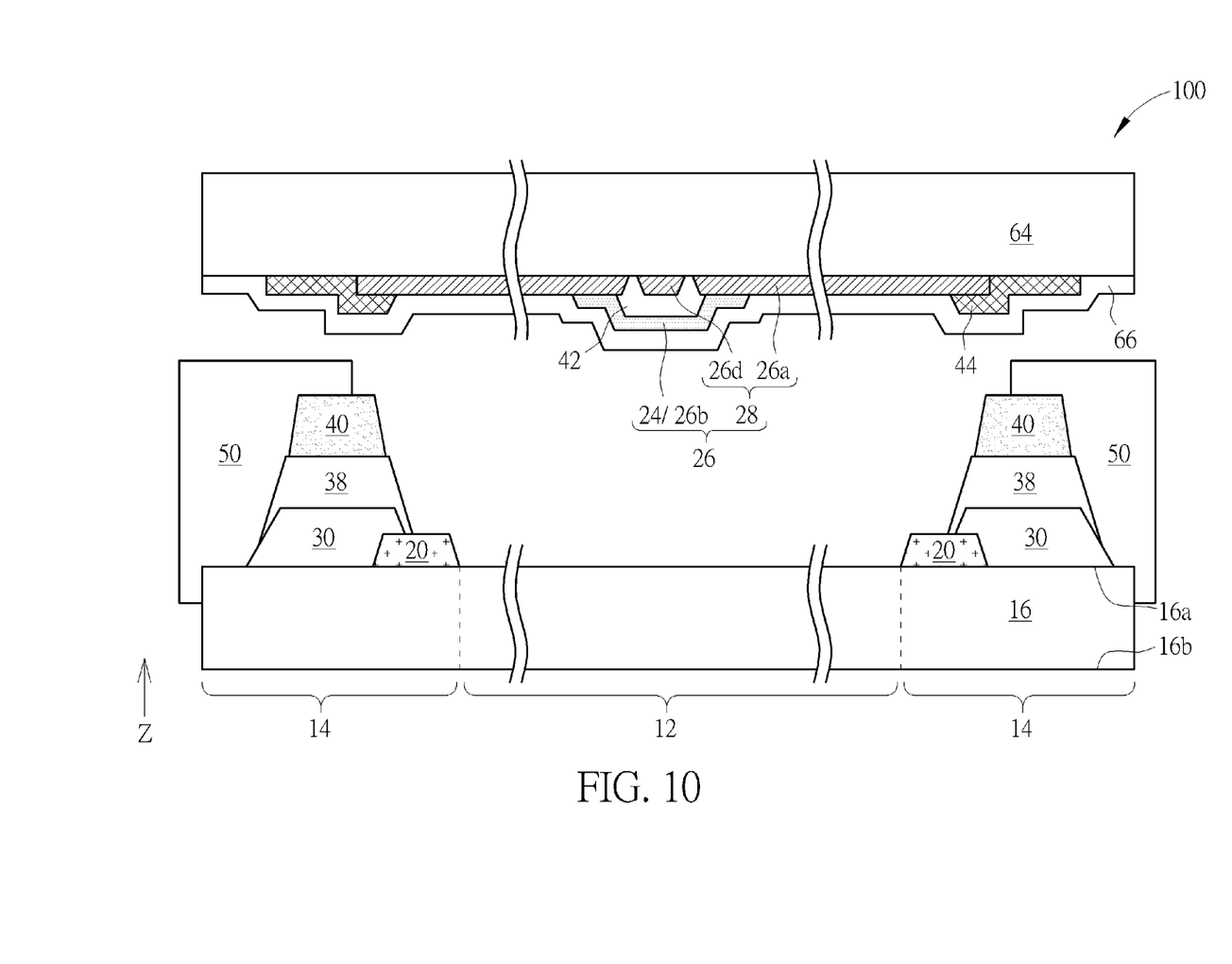
FIG. 10 is a schematic cross-sectional view illustrating a portion of a touch panel according to a fifth embodiment of the present invention.

Referring to FIG. 10, FIG. 10 is a schematic cross-sectional view illustrating a portion of a touch panel according to the fifth embodiment of the present invention. In the present embodiment, the touch panel 100 further includes a touch sensing substrate 64, disposed on a top side of the substrate 16, and the touch sensing element 26 is disposed on the bottom surface of the touch sensing substrate 62 (namely, the surface facing the surface 16a of the substrate 16), but not limited thereto. The touch sensing element 26 may be disposed on a top surface of the touch sensing substrate 64 in other embodiments. The shape and the disposition of the touch sensing element 26 for example can refer to what is disclosed in the first embodiment and the second embodiment, and will not be further detail herein, but the present invention is not limited thereto. The surface (namely the bottom surface) of the touch sensing substrate 64 further includes at least one wire 44 electrically connected to the touch sensing element 26, and the protection layer 46 covers the wire 44 and the touch sensing element 26. In the present embodiment, the stacking order and the structure of the inner frame 20, the patterned decoration frame 30, the decoration layer 38 and the black matrix layer 40 are similar to the aforementioned embodiments, and will not be further detailed herein. Please note that if the decoration layer 38 is fabricated by using a material with a higher optical density, the decoration layer 38 may only include a single layer or two layers and the inner frame 20 may be omitted optionally. Additionally, the touch panel 64 may optionally include the outer frame 50 disposed on the surface 16a of the substrate 16 and adjacent to the outer edge of the peripheral region 14. If the patterned decoration frame 30 and the decoration layer 38 are fabricated directly on the substrate 16 sliced from a large sized substrate, the outer frame 50 can be omitted and the patterned decoration frame 30 and the decoration layer 38 are directly extended to the peripheral region 14 and covers the outer edge of the peripheral region 14.

Please note that, the material of the substrate and the touch sensing substrate referring in the aforementioned embodiments of the present invention may be, for example, a glass substrate, a plastic substrate or a flexible film respectively, wherein the material of the flexible film may be polyethylene terephthalate (PET) film as an example. Therefore, the touch panel of the present invention can be applied to the design with the touch sensing element and the patterned decoration frame both being disposed on the same substrate (for example, an one glass solution (OGS) capacitive touch panel), or being disposed on different substrates. If the touch sensing element and the patterned decoration frame are disposed on different substrates, the substrate and the touch sensing substrate can be a rigid substrate or a flexible film individually, but not limited thereto. For example, the substrate is a rigid substrate while the touch sensing substrate is a flexible substrate. In different embodiments, both of the substrate and the touch sensing substrate may be flexible films, and an additional rigid substrate can be optionally incorporated thereto.

In summary, the touch panel of the present invention combines the patterned decoration frame and the decoration layer in different colors, to achieve stereoscopic stack structure to the peripheral region of the touch panel. Therefore, the present invention obtains a touch panel having more creative and colorful surfaces, so as to successfully embellish the appearance of the touch panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel having a light transmission touch sensing region and a peripheral region adjacent to at least one side of the light transmission touch sensing region, the touch panel comprising:
   a substrate, having a surface;
   a patterned decoration frame, disposed on the surface of the substrate and in the peripheral region, wherein the patterned decoration frame comprises at least one patterned hole exposing a portion of the surface of the substrate;
   a decoration layer, disposed on the patterned decoration frame, a portion of the decoration layer being filled in the patterned hole;
   at least one touch sensing element, disposed in the light transmission touch sensing region and on the surface of the substrate, wherein a portion of the touch sensing element extends toward the peripheral region and is disposed between the patterned decoration frame and the substrate in the peripheral region; and
   a wire electrically connected to the touch sensing element, wherein the wire is disposed on the decoration layer and covers a sidewall of the decoration layer, and a distance between the surface of the substrate and a portion of the wire disposed above the patterned hole is not equal to a distance between the surface of the substrate and a portion of the wire not disposed above the patterned hole.

2. The touch panel according to claim 1, wherein the decoration layer and the patterned decoration frame have different colors.

3. The touch panel according to claim 1, further comprising an inner frame disposed on the surface of the substrate and in the peripheral region, wherein at least one portion of the inner frame is disposed between the patterned decoration frame and the substrate.

4. The touch panel according to claim 3, wherein the inner frame comprises a black matrix layer.

5. The touch panel according to claim 3, wherein the inner frame comprises a first inner frame layer and a second inner frame layer sequentially stacked on the surface of the substrate.

6. The touch panel according to claim 1, wherein the decoration layer comprises a first decoration layer, a second decoration layer and a third decoration layer sequentially disposed on the surface of the substrate, and the third decoration layer encapsulates a sidewall of the second decoration layer and covers at least one portion of a sidewall of the first decoration layer.

7. The touch panel according to claim 1, wherein an outer edge of the patterned decoration frame is uncovered by the decoration layer.

8. The touch panel according to claim 1, further comprising an outer frame disposed on the surface of the substrate in the peripheral region, wherein the outer frame covers a portion of at least one of the patterned decoration frame and the decoration layer.

9. The touch panel according to claim 8, wherein the outer frame and the patterned decoration frame have an identical color.

10. The touch panel according to claim 8, wherein the outer frame and the decoration layer have an identical color.

11. The touch panel according to claim 1, further comprising:
a light shielding layer, disposed on the decoration layer; and
a protection layer, covered on the decoration layer and the patterned decoration frame.

12. The touch panel according to claim 1, wherein the patterned decoration frame comprises a plurality of patterned holes uniformly arranged in the patterned decoration frame and exposing a portion of the substrate.

13. The touch panel according to claim 12, further comprising at least one functional hole defined in the peripheral region, wherein the patterned holes of the patterned decoration frame are not located in the functional hole and an area surrounded the functional hole.

14. The touch panel according to claim 1, further comprising at least one functional hole defined in the peripheral region.

15. A fabrication method of a touch panel having a light transmission touch sensing region and a peripheral region adjacent to at least one side of the light transmission touch sensing region, the fabrication method comprising:
providing a substrate, the substrate having a surface;
forming at least one touch sensing layer on the surface of the substrate;
forming a patterned decoration frame on the surface of the substrate and in the peripheral region, the patterned decoration frame covering a portion of the touch sensing layer and the patterned decoration frame comprising at least one patterned hole exposing a portion of the surface of the substrate;
forming a decoration layer on the patterned decoration frame, the decoration layer partially covering a portion of the patterned decoration frame and a portion of the decoration layer being filled in the patterned hole; and
forming at least one wire disposed on the decoration layer and covering a sidewall of the decoration layer, the wire being electrically connected to the touch sensing element, wherein a distance between the surface of the substrate and a portion of the wire disposed above the patterned hole is not equal to a distance between the surface of the substrate and a portion of the wire not disposed above the patterned hole.

16. The fabrication method of the touch panel according to claim 15, wherein the decoration layer and the patterned decoration frame have different colors.

17. The fabrication method of the touch panel according to claim 15, further comprising forming a conductive layer on the surface of the substrate, wherein the conductive layer comprises
at least one bridge connection element, disposed in the light transmission touch sensing region, the bridge connection element being electrically connected to a portion of the touch sensing layer to form an axis electrode with the electrically connected touch sensing layer.

18. The fabrication method of the touch panel according to claim 17, further comprising forming a black matrix layer on the decoration layer before forming the conductive layer, and forming an insulating layer covering a portion of the black matrix layer after forming the black matrix layer and before forming the conductive layer.

19. The fabrication method of the touch panel according to claim 15, further comprising forming an inner frame on the surface of the substrate in the peripheral region before forming the touch sensing layer.

* * * * *